United States Patent
Town et al.

(10) Patent No.: US 9,025,426 B2
(45) Date of Patent: May 5, 2015

(54) OPTICAL DISC WITH PRE-RECORDED AND RECORDABLE REGIONS AND METHOD OF FORMING THE DISC

(71) Applicant: Thomson Licensing, Issy de Moulineaux (FR)

(72) Inventors: John Matthew Town, Ojai, CA (US); Alan Bruce Hamersley, Newbury Park, CA (US); Holger Hofmann, Tuebingen (DE)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 14/172,837

(22) Filed: Feb. 4, 2014

(65) Prior Publication Data

US 2014/0153374 A1    Jun. 5, 2014

Related U.S. Application Data

(62) Division of application No. 12/735,780, filed on Aug. 17, 2010, now Pat. No. 8,675,466.

(51) Int. Cl.
| | |
|---|---|
| G11B 7/24 | (2013.01) |
| G11B 7/007 | (2006.01) |
| G11B 20/00 | (2006.01) |
| G11B 20/12 | (2006.01) |
| G11B 7/24073 | (2013.01) |
| G11B 7/26 | (2006.01) |

(52) U.S. Cl.
CPC ........ *G11B 7/00736* (2013.01); *G11B 7/00718* (2013.01); *G11B 20/00855* (2013.01); *G11B 20/1217* (2013.01); *G11B 2020/1259* (2013.01); *G11B 7/24073* (2013.01); *G11B 7/0079* (2013.01); *G11B 7/263* (2013.01)

(58) Field of Classification Search
None
See application file for complete search history.

(56) References Cited

U.S. PATENT DOCUMENTS

| | | | |
|---|---|---|---|
| 5,481,530 | A | 1/1996 | Ueda et al. |
| 5,838,658 | A | 11/1998 | Nakane et al. |
| 5,859,820 | A | 1/1999 | Nagasawa et al. |
| 5,933,410 | A | 8/1999 | Nakane et al. |
| 5,959,946 | A | 9/1999 | Tognazzini |
| 6,438,098 | B1 | 8/2002 | Nakajima et al. |
| 6,480,462 | B2 | 11/2002 | Ha et al. |

(Continued)

FOREIGN PATENT DOCUMENTS

| | | |
|---|---|---|
| EP | 0570235 | 11/1993 |
| JP | 01079953 | 3/1989 |

(Continued)

OTHER PUBLICATIONS

Standard ECMA-272, 2nd edition: "120 mm DVD Rewritable Disk (DVD-RAM)", ECMA: Standardizing Information and Communication Systems, pp. 26-32, Jun. 1, 1999.

(Continued)

*Primary Examiner* — Paul Huber
(74) *Attorney, Agent, or Firm* — Robert D. Shedd; Robert B. Levy

(57) ABSTRACT

An optical disc having a region with pre-recorded data and a recordable region, a method of fabricating the disc, a stamper for forming a disc master, and a recording device for use with the disc are disclosed. Data recorded in the recordable region may be used for activation of the disc, providing unique identification or enhancing program content on the disc.

20 Claims, 7 Drawing Sheets

(56) References Cited

U.S. PATENT DOCUMENTS

| | | |
|---|---|---|
| 6,756,103 B2 | 6/2004 | Thompson et al. |
| 6,906,994 B2 | 6/2005 | Lee et al. |
| 7,269,123 B2 | 9/2007 | Abraham et al. |
| 7,452,582 B1 | 11/2008 | Nobukuni et al. |
| 8,036,096 B2 | 10/2011 | Knappmann et al. |
| 2002/0184115 A1 | 12/2002 | Mueller et al. |
| 2002/0188566 A1 | 12/2002 | Inchalik et al. |
| 2002/0191788 A1 | 12/2002 | Inchalik et al. |
| 2003/0002671 A1 | 1/2003 | Inchalik et al. |
| 2003/0007447 A1 | 1/2003 | Yeh et al. |
| 2003/0053403 A1* | 3/2003 | Miyamoto et al. ......... 369/275.3 |
| 2003/0214901 A1* | 11/2003 | Koyama et al. ............ 369/275.4 |
| 2005/0002297 A1* | 1/2005 | Nishimoto et al. ........ 369/47.21 |
| 2005/0254380 A1 | 11/2005 | Motohashi |
| 2006/0002243 A1* | 1/2006 | Murakami et al. ........ 369/13.01 |
| 2006/0087956 A1 | 4/2006 | Carson |
| 2006/0114755 A1 | 6/2006 | Eklund |
| 2007/0041280 A1* | 2/2007 | Nijboer et al. ............ 369/30.04 |
| 2007/0064545 A1 | 3/2007 | Carson et al. |
| 2007/0116920 A1 | 5/2007 | Krishnan et al. |
| 2007/0147220 A1 | 6/2007 | Meinders et al. |
| 2007/0248335 A1 | 10/2007 | Kuroda |
| 2009/0092010 A1* | 4/2009 | Kuijper et al. ............. 369/44.27 |
| 2010/0149938 A1* | 6/2010 | Takashima et al. ........ 369/47.15 |
| 2010/0157769 A1 | 6/2010 | Knappmann et al. |

FOREIGN PATENT DOCUMENTS

| | | |
|---|---|---|
| JP | 01150247 | 6/1989 |
| KR | 1020050121181 | 12/2005 |
| WO | WO0079526 | 12/2000 |
| WO | WO0118731 | 3/2001 |
| WO | WO2004109670 | 12/2004 |
| WO | WO2006080964 | 8/2006 |
| WO | WO2008048754 | 4/2008 |

OTHER PUBLICATIONS

Office Action for U.S. Appl. No. 14/169,111; Mar. 18, 2014.
Notice of Allowance for U.S. Appl. No. 14/169,132; Mar. 21, 2014.
Notice of Allowance for U.S. Appl. No. 14/169,111 dated Feb. 11, 2015.

* cited by examiner

OPTICAL DISC WITH PRE-RECORDED AND RECORDABLE REGIONS AND METHOD OF FORMING THE DISC

CROSS-REFERENCE TO RELATED APPLICATIONS

This application is a divisional of co-pending U.S. application Ser. No. 12/735,780 filed Aug. 17, 2010, which claims the benefit, under 35 U.S.C. §365, of International Application PCT/US2009/001036 filed Feb. 19, 2009 which was published in accordance with PCT Article 21(2) on Aug. 27, 2009 in English and which claims the benefit of U.S. Provisional Patent Application No. 61/066,305 filed on Feb. 19, 2008, all of these applications are herein incorporated by reference in their entirety.

TECHNICAL FIELD

This invention relates to storage media in the form of an optical disc.

BACKGROUND

Pre-recorded optical media (e.g., optical discs) can be mass-replicated inexpensively and constitute an ideal distribution medium for many types of data, including, for example, compact disc (CD)-Audio, digital versatile disc (DVD)-Video, CD read-only memory (CD-ROM), Blu-ray discs (BD). Many optical disc applications can be enhanced or made more secure if the pre-recorded discs are made unique or serialized such that a typical readout device can identify the unique information. This is currently only possible with recordable media that has an added expense associated with recording, or on pre-recorded media via Burst Cutting Area (BCA) code writing for DVD, BD, and so on, where BCA has limited data capacity and limited application compatibility.

A proposed alternative for improving disc security involves the use of radio-frequency identification (RFID) technology, in which an optical media with pre-recorded content is provided with an electro-optic layer, which allows the media to be disabled at a manufacturing facility, and subsequently enabled at a point of sale using RF activation. There is, however, still a need for additional techniques for disc activation in a manufacturing, a distribution or a retail setting.

SUMMARY OF THE INVENTION

Embodiments of the present principles provide an optical disc having pre-recorded and recordable regions, various groove structures or configurations, as well as method of forming the disc, a stamper for forming a disc master, and a recording device for writing data to the recordable region.

One embodiment provides an optical disc, which includes a first region with pre-recorded data including program content, and at least one recordable region. The program content is unreadable until additional data is written to the recordable region.

Another embodiment provides an optical disc, which includes a recordable region having at least one groove with a plurality of gaps, in which the at least one groove is configured for use in recording data.

Another embodiment provides an optical disc, which includes a recordable region having at least one grooveless region, in which the at least one grooveless region is configured for recording data.

Another embodiment provides an optical disc, which includes a first region with pre-recorded data formed on a substrate, a second region including one or more recordable areas having at least one groove; and a recording layer formed only in the second region.

Another embodiment provides a method of fabricating an optical disc, which includes: (a) forming a first region with pre-recorded data on a substrate, (b) forming a second region with at least one groove on the substrate, and (c) forming a recording layer only in the second region.

Another embodiment provides a stamper for use in fabricating optical discs, which includes features for forming at least one groove and a plurality of pits on the disc, in which the features include at least one of: forming a groove having a plurality of gaps, and forming a blank section with a length greater than about 10 µm and less than about 100 µm between two pits.

Another embodiment provides a recording device, which includes a processor configured for executing a program having instructions for performing a method, the method including retrieving information for identifying at least one recordable region of a disc by one of: accessing pre-recorded data on the disc, and accessing a database external to the disc; and directing a laser to write additional data to the at least one recordable region.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
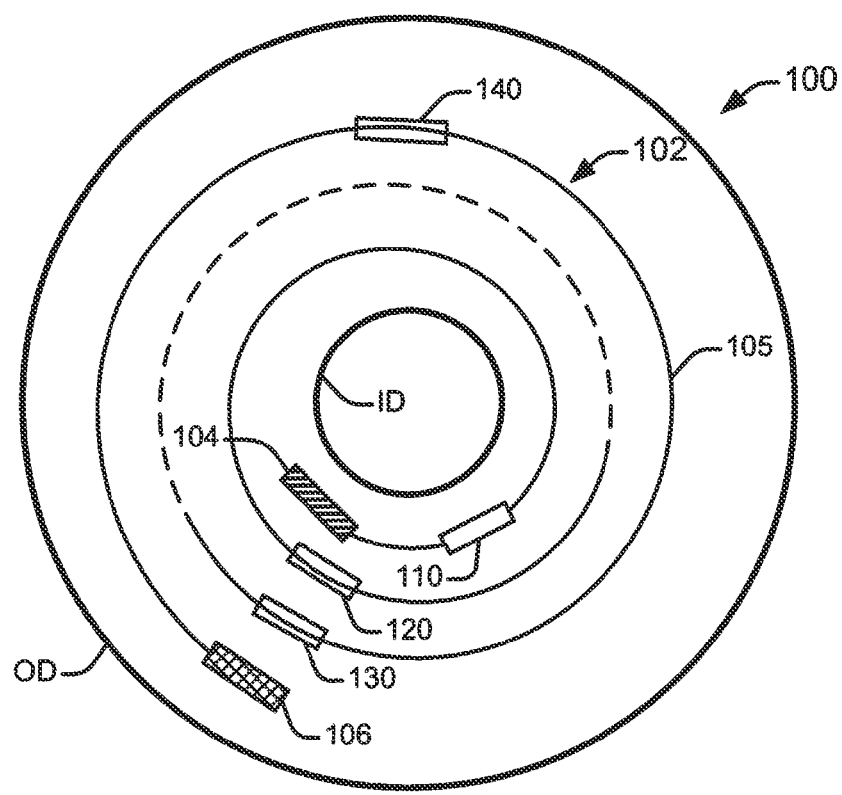
FIG. 1 illustrates a top view of an optical disc according to one embodiment of the present invention.

Embodiments of the present principles provide an optical disc having pre-recorded and recordable regions (also referred to as a "hybrid" disc), a method of fabricating the disc, as well as a disc master and stamper that include various features in the pre-recorded and recordable regions, and a recording device for recording data in the recordable regions of the disc. A pre-recorded region refers to a region containing data that is formed during manufacturing of the disc. Such pre-recorded data may include control data, file systems, and program content representing the subject matter of the disc, e.g., software, audio and/or video content, or other content intended for the user(s) of the disc.

One or more recordable regions, which may include structures different from those of conventional discs, are provided for the recording of additional data. The additional data may include predetermined data required for disc activation so that content on the disc can be made readable or accessible to end users, for disc serialization or customization, for providing enhancements or updates to the disc's pre-recorded content (e.g., may be appended to the existing program file/content), and so on. The additional data to be written to the disc is usually a relatively small amount compared to the pre-recorded program content. Furthermore, if the pre-recorded program content is in encrypted form, the additional data may include decryption information, e.g., a decryption key, which can be written to at least one recordable region of the disc to render the program content readable. The additional data may be written using a custom recording device at a facility in a product distribution chain or at a point-of-sale.

The optical disc is initially manufactured (e.g., replicated or duplicated) with a region of the disc containing pre-recorded data and at least a region of the disc being unrecorded but available for recording of data with a suitable recording device. In the case of a replicated disc, the pre-recorded data is formed by stamping into a substrate of the disc as with injection molding, and a reflective layer is provided for reading the pre-recorded data, as in conventional pre-recorded discs.

However, unlike a conventional pre-recorded disc, a recording layer is also applied to the molded substrate before bonding with a top substrate. The recording layer provides additional recording space for completing the recording in a subsequent recording device and process, which is performed offline, i.e., after the disc manufacturing process. Thus, the recording device for performing the finalization is different from the device used to encode the pre-recorded data.

The resulting pre-recorded disc has a capability and capacity to be individually written to or "serialized" with unique, custom and/or control data during the offline recording or finalization process. The finalized disc will be recognized by conventional optical disc drives as pre-recorded with no ability for further writing or recording. Such a finalizing process may be used for controlled activation of the disc, i.e., at least the pre-recorded program content is not readable until appropriate data, e.g., control or unique data are written, and the finalization process has been successfully completed. This finalization process requires the correct or appropriate information being recorded, in order for the disc and its program content to become readable by an end user's disc player. Unlike conventional finalization processes in which information is written to the lead-in or lead-out areas after recording, the finalization process according to the present principles may record information outside the lead-in and lead-out areas. Thus, pre-manufactured discs can be securely distributed to end users, distribution centers or point-of-sale kiosks, which can finalize the discs with appropriate secure recording devices.

The additional data to be recorded in the finalization procedure may include disc activation data, custom data for augmenting or updating program content on the manufactured disc (including data that allows the program content to be usable), unique product information or code that is individually serialized, control data, or file system data. For encrypted program content, a decryption key may also be required to be written to the disc before the program content becomes readable. As used herein, "custom" data refers to any data that is recorded to the information area of the disc, which may include control data, or serialization data, or other data that is custom or unique to the disc. "Control" data may include physical format information, disc manufacturing information and contents provider information.

FIG. 1 shows a top view of an optical disc 100 after manufacturing (but before finalization) according to one embodiment of the present invention. The optical disc 100 may generally be any optical disc, e.g., CD, DVD or Blu-ray disc, with program content data, e.g., video, audio, software or other data, recorded in a continuous spiral pattern 102, with each 360° turn of the spiral forming a track. For the sake of clarity, intermediate tracks of the spiral are omitted from FIG. 1 and designated by a dashed line. A lead-in area 104 is provided at the beginning of the spiral 102, and a lead-out area 106 is provided at the end of the spiral 102. The lead-in area 104 generally contains a control data zone, which contains control data such as the physical format information, disc manufacturing information and contents provider information. By reading this control data, a disc player can then access the user data content (e.g., pre-recorded program such as a movie, software, and so on) of a disc. For a recordable disc, data is written to the lead-in area when a recording session is closed. In one embodiment of disc 100, the lead-in area contains both pre-recorded control data and at least one recordable area for recording additional control data. The lead-out area 106 indicates the end of data on the disc 100, and typically does not contain any data.

The portion of the spiral 102 between the lead-in and lead-out areas may be referred to as a program area 105, which contains data corresponding to one or more programs on the disc 100. Aside from the recorded program data, one or more recordable areas or regions 110, 120 and 130 are also provided between the lead-in and lead out areas 104 and 106. These recordable areas, which may also correspond to individually accessible sectors on the disc, allow additional data to be recorded at a later stage, i.e., after the disc 100 has been manufactured. In various embodiments, the recordable zones may be identified by sector numbers, signal characteristics and/or custom zone identifiers which can be used for guiding a recording device to the proper recordable locations during recording. These identifiers, or information relevant to the recording process, are different from control data or information in conventional optical discs. They may be provided (during the manufacture process) anywhere in an information zone on the disc, and may also be available in the form of a database in a storage device (outside the disc) and accessible by a disc reader. As used in this discussion, the term "information zone" refers generally to any region of the disc where data is present, including pre-recorded and later recorded data. In one type of dual-layer discs, the information zone also includes middle zones (i.e., transition regions between two data layers) that have dummy data used for optical pickup and addressing purpose.

Since program data in area 105 is encoded on the disc 100 during manufacturing, e.g., by molding of a substrate, it is referred to as "pre-recorded" data, to distinguish it from data that may be recorded in areas 110, 120 or 130 at a later stage.

Figure 2:
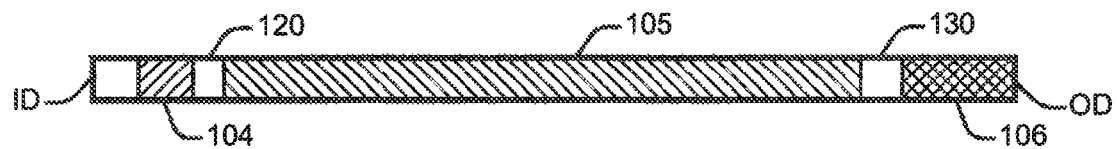
FIG. 2 illustrates a cross-sectional view of the optical disc of FIG. 1.

FIG. 2 is a sectional view from an inner diameter ID to an outer diameter OD of the disc 100, showing representative recordable regions 120, 130 and pre-recorded area 105 between the lead-in area 104 and lead-out area 106.

Figure 3A:
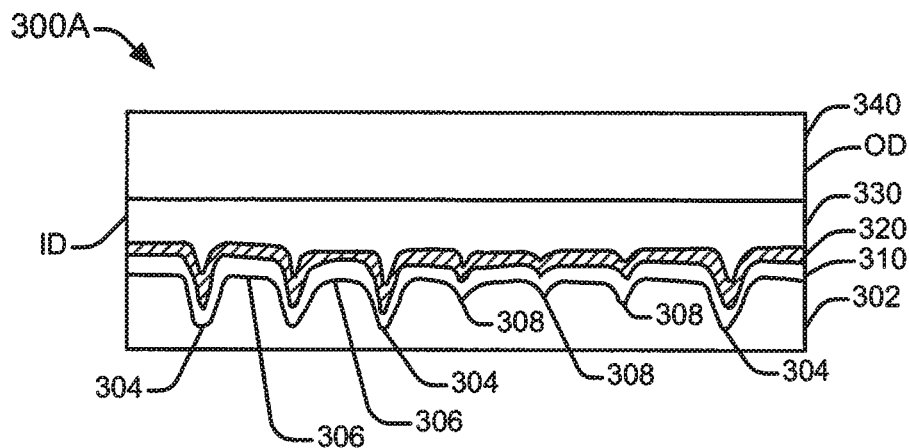
FIG. 3a illustrates a cross-sectional view of various material layers of an optical disc according to one embodiment of the present invention.

FIG. 3a shows a cross-sectional view (e.g., from inner diameter ID to outer diameter OD) of various material layers of an optical disc 300A manufactured according to one embodiment of the present invention. The disc 300A has a first substrate 302 having pits and lands 304, 306, one of which representing data, e.g., corresponding to data in the program area 105 of FIG. 1. The substrate 302 is further provided with one or more grooves 308 in at least one recordable region of the disc 300, e.g., corresponding to regions 110, 120 or 130 in FIG. 1. These grooves are absent in pre-recorded areas with pits and lands. The substrate 302 is usually made of a transparent material that allows optical access for reading data on the disc, e.g., polycarbonate or other suitable materials. In one embodiment, the pits, lands and grooves on substrate 302 are formed by molding the substrate 302 with a stamper (to be discussed below) using techniques known in optical disc manufacturing.

A recording layer 310 is then formed over the molded substrate 302, e.g., by spin coating. Suitable recording medium or materials for the recording layer 310 include organic, inorganic or phase change materials. In one embodiment, the recording layer 310 is deposited over the entire surface of the substrate 302, i.e., over the pre-recorded area of the pits 304 and lands 306, as well as the recordable areas with grooves 308. A reflective layer 320 is then deposited over both the pre-recorded areas and the recordable areas by sputtering. Depending on the specific disc or applications, different materials such as silver, silver alloy, aluminum, among others, may be used in forming the reflective layer. The thickness of the recording layer 310 and the reflective layer 320 also vary according to the specific materials and the type of optical discs being manufactured.

After the formation of the reflective layer 320, an adhesive or bonding layer 330 is used to bond the metalized structure of substrate 302 to a top substrate 340, which is typically another transparent material, e.g., polycarbonate.

In another embodiment, the recording layer 310 is formed only over certain region(s) of the disc 300, e.g., by masking the pre-recorded region(s) of the disc 300 and sputtering the recording layer 310 such as inorganic or phase-change materials onto the unmasked region(s). Alternatively, a suitable recording medium may also be selectively applied by spin-coating to certain areas of the disc.

Figure 3B:
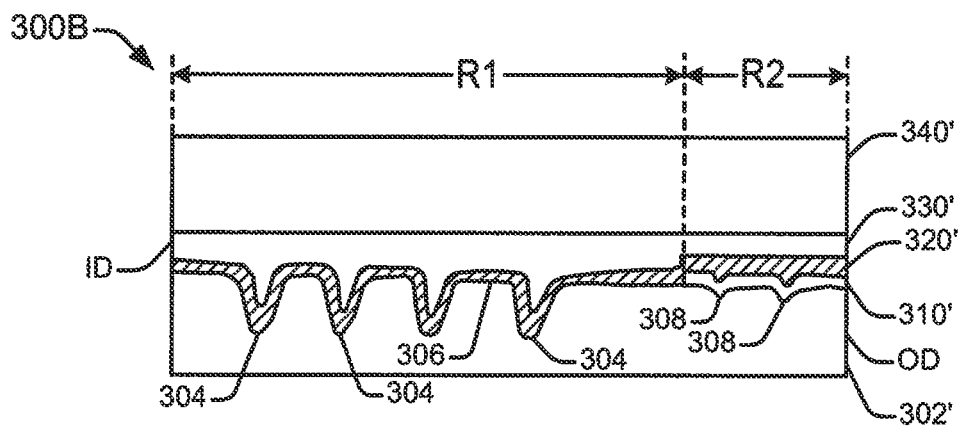
FIG. 3b illustrates a cross-sectional view of various material layers of an optical disc according to another embodiment of the present invention.

This is illustrated in FIG. 3b, which shows a cross-sectional view (e.g., from inner diameter ID to outer diameter OD) of a disc 300B having a recording layer 310' formed over only a selective portion of the substrate 302'. In this example, region R1 of the substrate 302' is masked before the recording layer 310' is deposited onto the substrate 302' in only region R2. Region R1 may include all portions of the disc with pre-recorded data, and region R2 may correspond to an outer portion of the disc 300B that includes all recordable areas. After forming the recording layer 310', the mask (not shown) is removed before forming the reflective layer 320' over the entire disc 300B. Similar to the example of FIG. 3a, a top substrate 340' can be bonded to the reflective layer 320' using a bonding layer 330'.

Figure 3C:
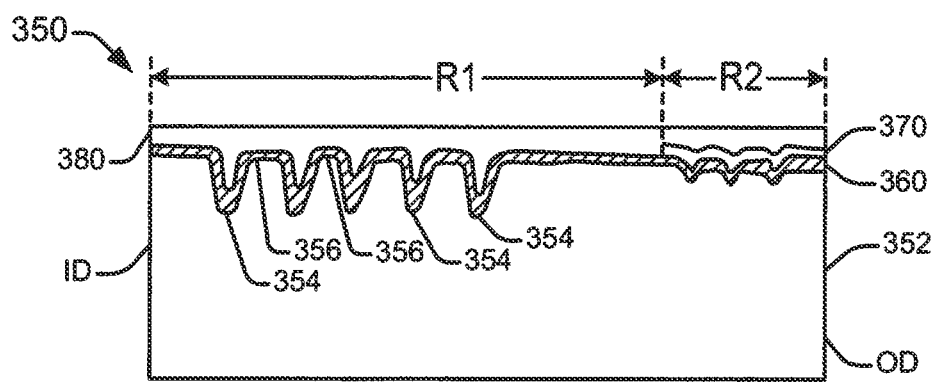
FIG. 3c illustrates a cross-sectional view of various material layers of an optical disc according to yet another embodiment of the present invention.

Another example is shown in FIG. 3c, which is a cross-sectional view (e.g., from inner diameter ID to outer diameter OD) of a disc 350, e.g., a Blu-ray disc, with one or more pre-recorded data region(s) and at least one recordable region with one or more grooves for recording additional data. In this example, pits 354 and lands 356 (representing pre-recorded data) as well as one or more grooves 358 in a recordable region are formed in a substrate 352. The substrate is a 1.1 mm polycarbonate, and the data and groove features may be formed by injection molding and stamping. A reflective layer 360 is formed over the substrate 352. A region R1 of the substrate structure is masked off, and a suitable recording layer material (e.g., inorganic or phase change materials) is deposited onto the unmasked region R2 of the reflective layer 360, resulting in the formation of the recording layer 370. A cover layer 380, e.g., 0.1 mm of a suitable material, is then formed over the entire structure. In the case of the Blu-ray disc, data is read from the side of the cover layer 380.

Although the above examples pertain to a single layer disc, principles of the invention can be extended to a double layer disc. Thus, one or both layers of a double layer disc may contain recordable areas with associated recording grooves. If recordable areas are present in only one of the two data layers, the other layer can be manufactured using conventional techniques. In addition, other embodiments also include having the pre-recorded area on one layer and the recordable area on a different layer.

Figure 4:
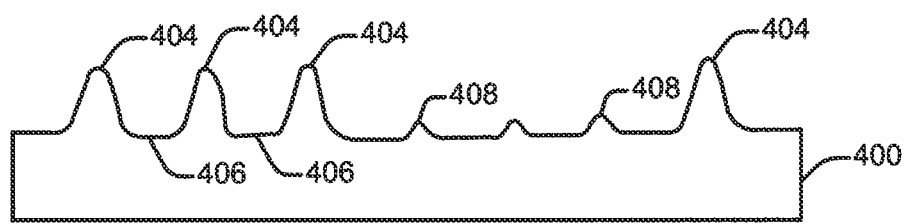
FIG. 4 is a schematic illustration of a portion of a stamper that can be used for fabricating an optical disc of the present invention.

As mentioned above, a stamper is used to form the various features in the molded substrate. One embodiment is illustrated in FIG. 4, showing a portion of a stamper 400 having features that are complementary to those on substrate 302 of FIG. 3a, e.g., protrusions 404 for forming pits 304, indents 406 for forming lands 306, and protrusions 408 for forming grooves 308. Absent from the stamper 400 are features corresponding to the additional data, e.g., control data or other data in the lead-in and/or other recordable areas of a manufactured disc that are required to render the disc readable. In general, a stamper of the present invention includes features for forming one or more recording grooves on a disc, and data tracks characterized by pits and lands. The recording groove(s) may have different structures and/or configurations that will be presented in later sections of this discussion.

The stamper 400 can be made using conventional techniques and materials known in optical disc manufacturing. In one embodiment, the stamper 400 is made by electroforming a metal, e.g., nickel, over a metalized glass master, which has data and groove features that are complementary to those of stamper 400.

Figure 5A:
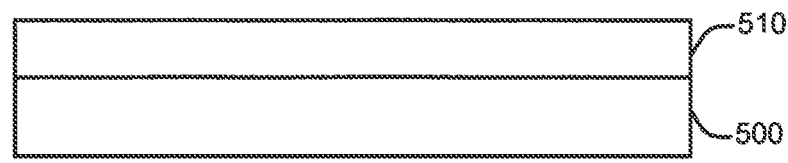
FIGS. 5a-c are cross-sectional views of the fabrication of a glass master suitable for forming the stamper features of FIG. 4.
Figure 5B:
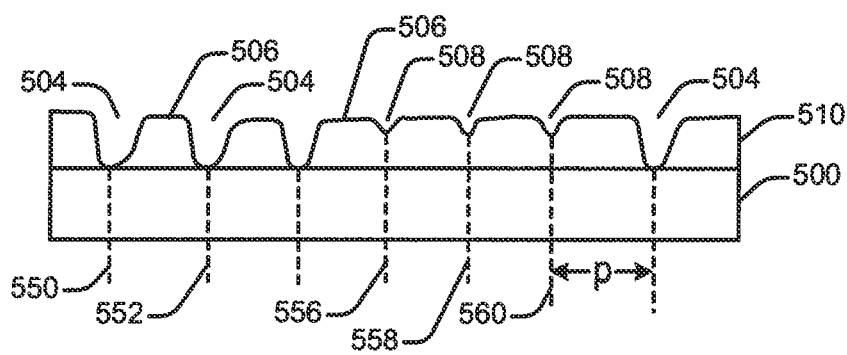
Figure 5C:
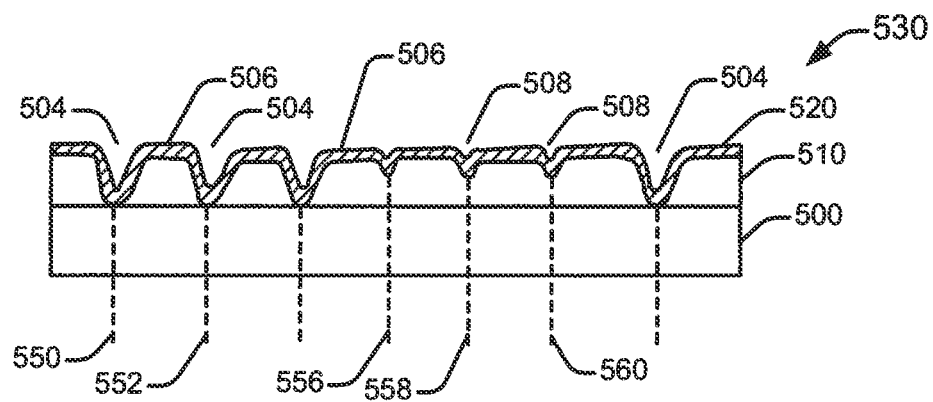

FIGS. 5a, 5b and 5c illustrate schematically the fabrication of a metalized glass master that may be used for forming features of the stamper 400 (FIG. 5a-c show only the cross-sectional views of features corresponding to those in FIG. 4). FIG. 5a shows a blank glass substrate 500 provided as a carrier for a photoresist layer 510, which can be spin-coated onto the glass substrate 500. By exposing the photoresist 510 to a laser beam recorder or encoder (to be further discussed below), features corresponding to pits 504, lands 506 and grooves 508 can be formed in the photoresist after the exposed resist is developed in a chemical solution, as illustrated in FIG. 5b. (For a positive photoresist, areas exposed to the laser beam are removed by the developer, forming the pits, while areas that are not exposed will remain, forming the lands.) Dash lines in FIG. 5b represent various data tracks, e.g., tracks 550 and 552 for pre-recorded data, with distance between adjacent tracks denoted by a track pitch, p. In the case of a DVD, the track pitch is 740 µm. In one embodiment, grooves 508 are provided at various positions along the pre-recorded data tracks (e.g., tracks 556 and 558), and may be referred to as "on-track" grooves.

Figure 5D:
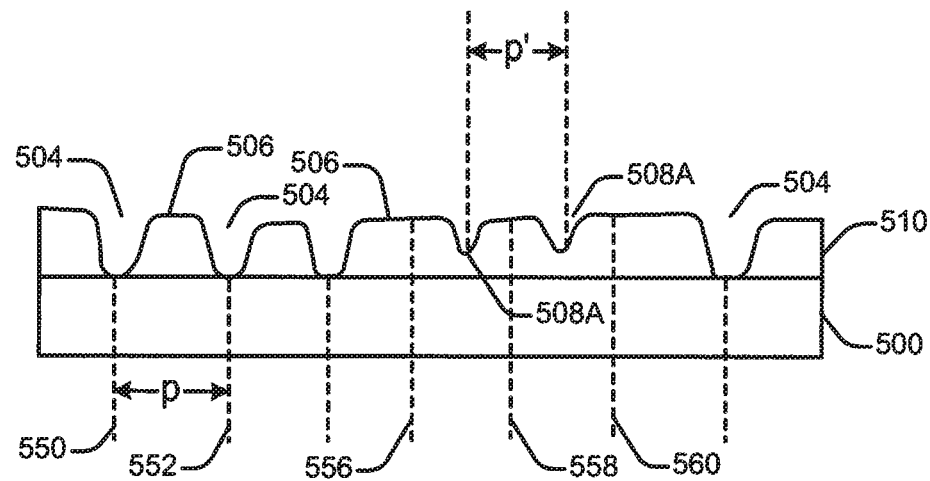
FIG. 5d is a cross-sectional view showing an alternative groove arrangement.

Alternatively, one or more grooves 508A may be positioned between the data tracks, referred to as "off-track" grooves, which is shown in FIG. 5d. Off-track grooves 508A, if present, are provided as a minimum of two adjacent grooves, i.e., between pairs of adjacent pre-recorded data tracks (e.g., 556-558 being one pair, and 558, 560 being another pair), which allow proper tracking in order to record data on the spiral track between the two off-track grooves, e.g., track 558. Grooves 508A may have a separation or pitch (p') that is the same or different from the track pitch (p) of the pre-recorded data tracks, and may also have a groove depth that is different from that of grooves 508.

In these illustrations, recording grooves 508 and 508A have depths less than the depth of pits 504 in the pre-recorded data area. In other embodiments, the recording grooves may have a depth comparable to, or larger than, that of the pits. In general, a recording groove has a length at least as long as what is required for the appropriate data to be recorded in the corresponding recordable area.

Figure 5E:
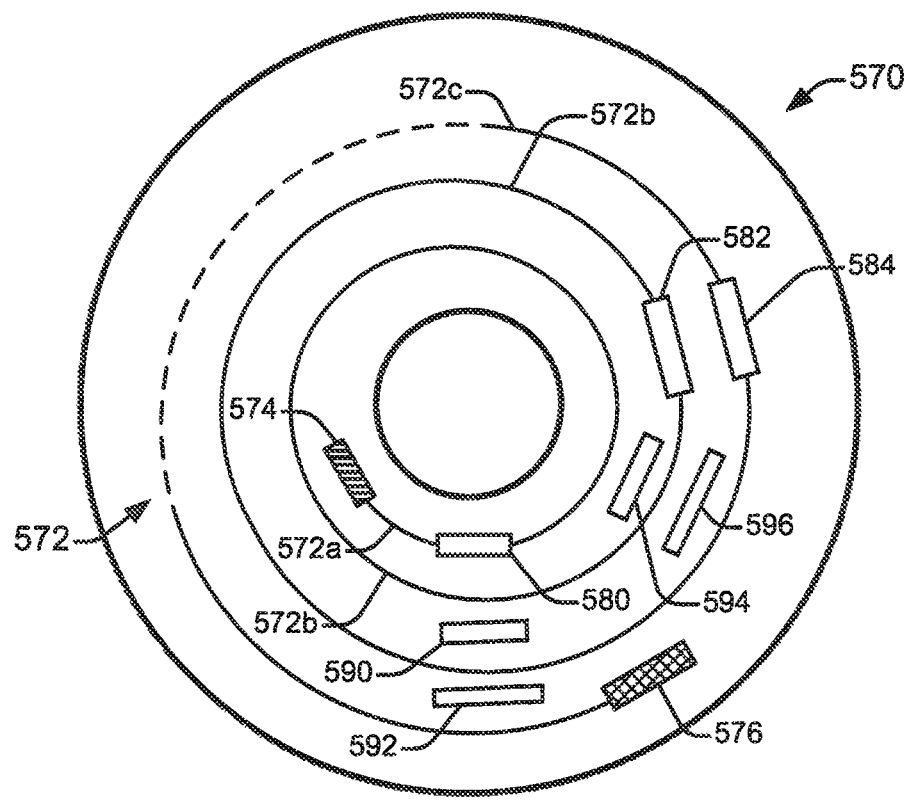
FIG. 5e is a top view of an optical disc having areas with different groove arrangements.

Grooves 508 and 508A may also co-exist on the same disc, as shown in FIG. 5e, which illustrates a top view of a disc 570 according to one embodiment of the present invention. The disc 570 has pre-recorded data arranged in a spiral track pattern 572 (dashed line denotes additional tracks that are omitted), with a lead-in region 574 and a lead-out region 576. On-track grooves 580, 582 and 584 (similar to 508 in FIG. 5b) are provided in one or more recordable regions on tracks 572a, 572b and 572c (i.e., following the pre-recorded spiral track pattern 572), while off-track grooves 590, 592, 594 and 596 (similar to 508A in FIG. 5d) are provided between adjacent pre-recorded data tracks. As mentioned, off-track grooves, if present, are provided as at least a minimum of two adjacent grooves (e.g., 590-592 pair, or 594-596 pair in FIG. 5e). Furthermore, to enable proper tracking, an on-track groove and an off-track groove cannot be directly adjacent to each other. Instead, at least some pre-recorded data feature on a track should be located between an on-track groove and an off-track groove, as shown in the example of on-track groove 580 and off-track groove 590 positioned on either side of pre-recorded data of track 572b.

Returning to FIG. 5b, after patterning the photoresist 510 with the respective pits, lands and grooves, the glass substrate 500 with the patterned photoresist structure is metallized by forming a thin layer of metal 520, e.g., nickel, over the entire structure, resulting in a metallized glass structure 530 as shown in FIG. 5c. The structure 530 is then subjected to electroforming, which deposits additional metal onto the metal layer 520 to form a stamper, such as stamper 400.

Different approaches may be used to perform the encoding of the pits 504, lands 506 and grooves 508 in the glass master using one or more encoders. In one embodiment, a dual-purpose encoder with two different pattern generators (each having a different algorithm), one channel of the encoder is used for encoding the program or user data, e.g., in the program area 105 of FIGS. 1-2, as a standard pre-recorded disc, and a second channel is used for encoding one or more recording grooves in at least one recordable area, e.g., areas 110, 120 and 130 of FIGS. 1-2.

The dual-purpose encoder includes software and hardware that enable seamless switching between the groove and data track recording as required for this disc format. In one embodiment, a single wavelength is used for encoding both data and grooves, e.g., using a blue laser at 405 nm.

Different recording groove structures and configurations, as well as recording options in the pre-recorded and recordable regions, are provided in different embodiments described below.

In one embodiment, one or more recording grooves in the recordable areas are relatively shallow, e.g., less than about 100 nm. In another embodiment, one or more groove may be less than about 50 nm, which is suitable for use with a recording laser or device having a wavelength in a blue-violet region. In another embodiment, the grooves and the recording layer conform to a recording format described in an international PCT patent application "Compatible Optical Recording Medium", filed by Thomson Licensing, and published as WO 2008/043661A1, on 17 Apr. 2008, which is herein incorporated by reference in its entirety. This format, referred to as the Thomson Blue Laser Content Scramble System (CSS) Recordable (BLCR) disc format, provides for recording at one wavelength (e.g., 405 nm), and reading at a different wavelength (e.g., 650 nm). The groove structure is designed to generate a sufficiently strong push-pull (PP) signal at the recording wavelength to allow tracking or guiding an optical pickup unit during recording, but only a minimal or very weak PP signal at the reading wavelength.

Thus, a standard disc player operating at the reading wavelength will not detect the presence of the recording groove, and the disc will be treated as a read-only disc, which results in a high degree of compatibility with most disc players (because some players have a copy protection mechanism that renders a read-only disc unreadable if a PP signal is also detected from a groove structure). In one embodiment, the groove structure has a width of less than about 120 nm and a depth of about 40 nm. In other embodiments, the groove may have a width in a range of about 50 nm to about 250 nm, and a depth in a range of about 10 nm to about 50 nm.

Although other groove configurations or formats may not offer as high a degree of player compatibility as the BLCR format, they can also be used in the context of the present invention.

Thus, in one example, one or more deep grooves, e.g., with a depth of at least about 120 nm, are provided in at least one recordable area of the disc. In this case, data (e.g., custom, control data or other appropriate data) can be written to the recordable areas with a conventional recorder, e.g., at a wavelength of 650 nm for DVD, since a sufficient push-pull signal will be available for tracking with a red laser pick-up head.

Figure 6A:
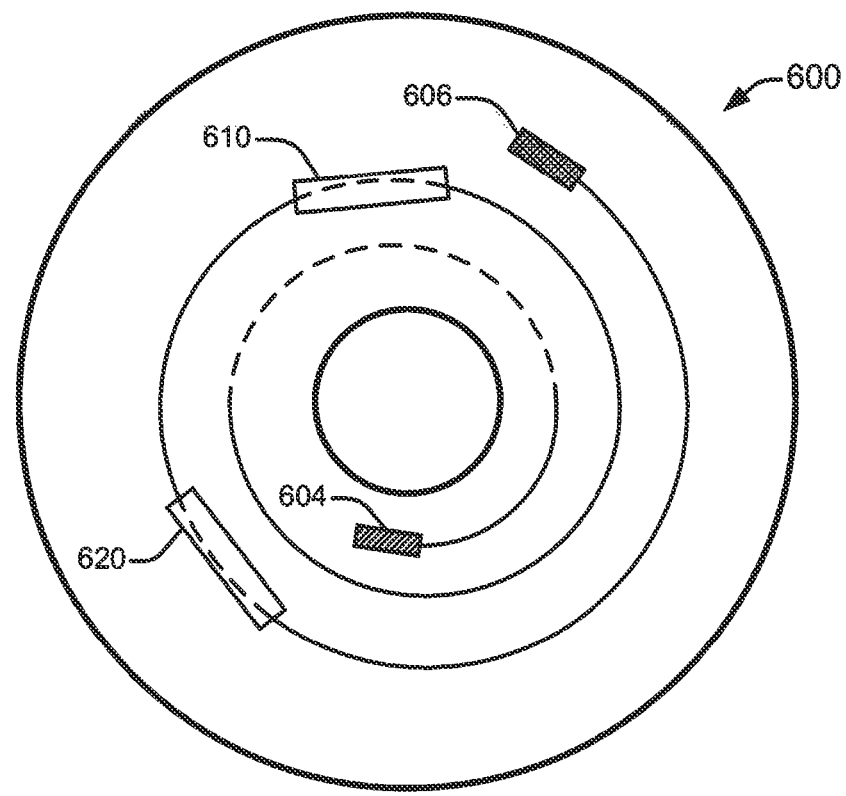
FIG. 6a is a top view of one embodiment of a disc having discontinuous grooves according to one embodiment of the present invention.

Another embodiment of the recording grooves is illustrated in FIG. 6a, which shows a top view of a disc 600 having one or more recordable areas 610 and 620 between a lead-in area 604 and a lead-out area 606. In this case, the grooves in the recordable areas 610 and 620 are discontinuous grooves, consisting of long pits interrupted or separated by short gaps or discontinuities in the groove.

Figure 6B:
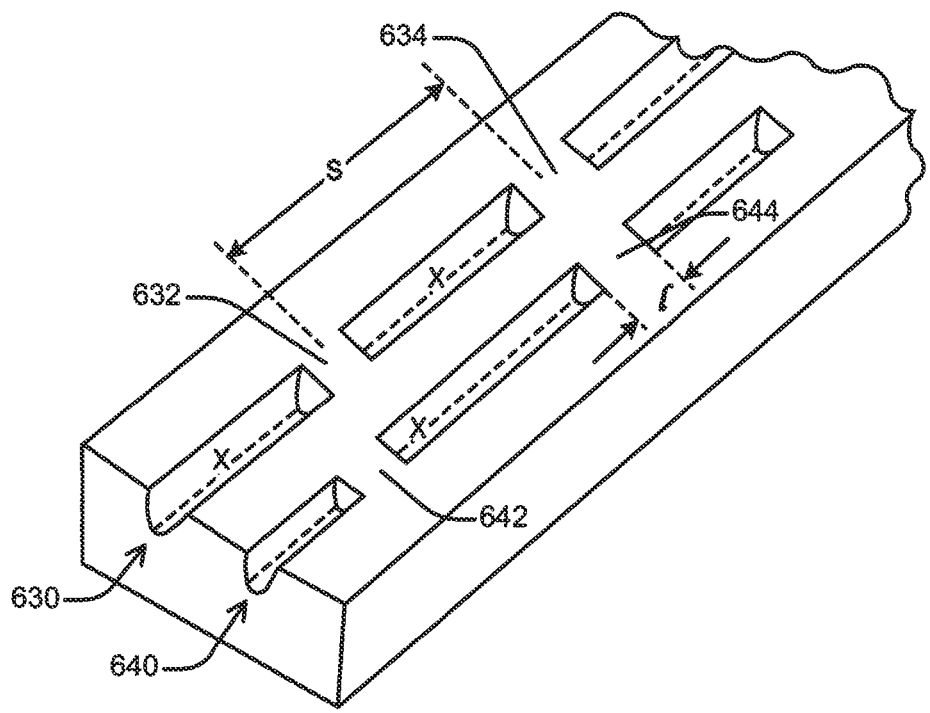
FIG. 6b is a perspective sectional view of two discontinuous grooves.

FIG. 6b is a schematic illustration of a perspective view of two discontinuous grooves 630, 640 in adjacent tracks. These grooves are considered discontinuous because they have gaps (i.e., no groove, or discontinuous section of the groove) along the length of the grooves, e.g., gaps 632, 634, 642 and 644. In one embodiment, the gaps are regularly spaced along the length of the groove, e.g., at a separation (s), which can range from about 500 nm to about 2000 nm. Other embodiments may have gaps that are not regularly spaced within a groove. The length (l) of each gap or interruption is smaller than the resolution of the red pick-up head, e.g., length l is less than about 200 nm, but should be at least long enough to generate a sufficiently strong tracking signal, e.g., DPD tracking signal, for recording purpose. In one embodiment, it is expected that a gap length of at least about 75 nm will suffice for DPD tracking. It is possible that the optimum gap length may vary with the depth of the groove. The lengths of the gaps in a non-continuous groove (or in different grooves) may be the same or different.

It is expected that this non-continuous groove configuration will allow the use of differential phase detection (DPD) tracking when recording with a blue laser during the finalization process. In addition, the discontinuous groove with DPD tracking can generally be used for recording in other disc formats, i.e., not only in the finalization process of a hybrid disc of the present invention, but also in other conventional discs.

The use of non-continuous grooves in the recordable areas has the advantage that DPD can be used for tracking the pre-recorded pits and the grooves for recording, as opposed to having to switched to PP tracking if continuous grooves were used in the recordable areas (since DPD tracking does not work with continuous grooves).

In this embodiment, the grooves may have a depth ranging from about 10 nm to about 300 nm, and a width between about 50 nm to about 250 nm. Additional data including, for example, custom or control data, may be recorded on the grooves, e.g., at sample locations X anywhere inside a groove, and/or at one or more locations at the gaps, e.g., gaps 632, 634, 642 and 644, as shown in FIG. 6b.

To provide effective DPD tracking, it is expected that many gaps be provided in a groove, e.g., at least two gaps per groove. In one embodiment, a gap separation (s) is less than about 10 μm (i.e., at least one gap for every 10 μm along the groove), and in another embodiment, the gap separation is about 0.5 to about 2 μm. The dimensions of these gap separations are suitable for DVDs, and will vary for other disc formats such as Blu-ray discs (BD) or CDs. The dimensions for gap separations for other disc formats can be obtained by one skilled in the art using appropriate scaling relationships.

There are certain scenarios under which a groove with one or more gaps may not function with DPD tracking. These scenarios include situations when only a single gap is provided in a groove, if the gaps are provided at a separation considerably larger than 10 μm, or if a gap is considerably smaller than about 100 μm, then the groove will effectively serve as a continuous groove, in which case, PP tracking will be required (DPD tracking will not be feasible).

Figure 7A:
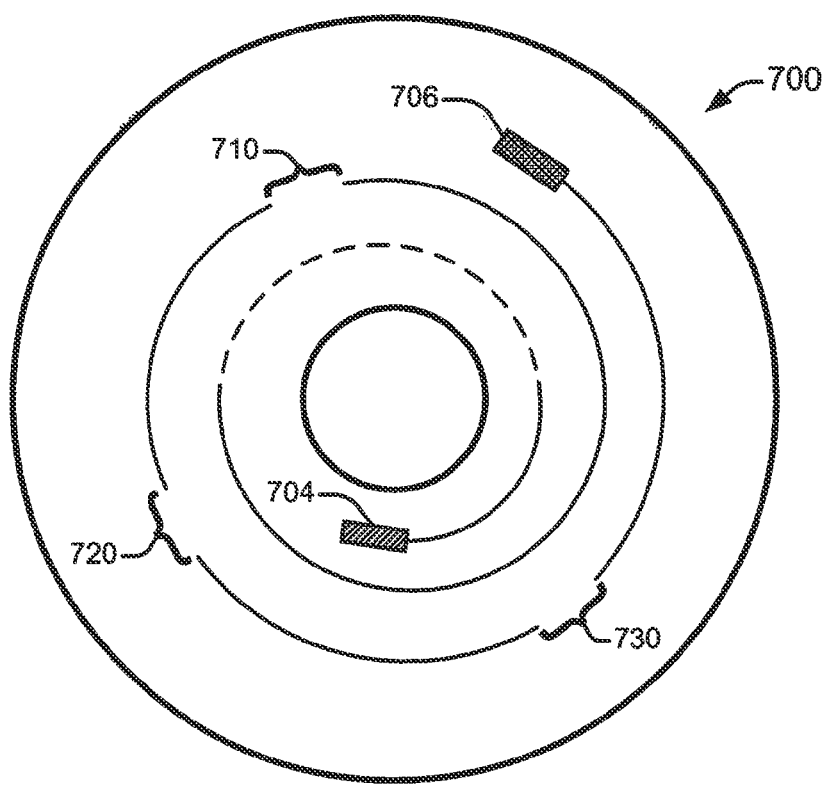
FIG. 7a is a top view of a disc according to another embodiment.

FIG. 7a illustrates one embodiment of an optical disc 700, with a lead-in area 704 and a lead-out area 706. The disc 700 also has at least one blank section on a track in one or more recordable areas, e.g., sections 710, 720 and 730 that are left blank, i.e., without any pits or recording grooves. If these blank recordable sections are relatively short, e.g., having a length on the order of 100 μm or less, they are not expected to affect tracking by a pickup unit because the inertia of the pick-up unit will be able to keep the recording beam on track.

Figure 7B:
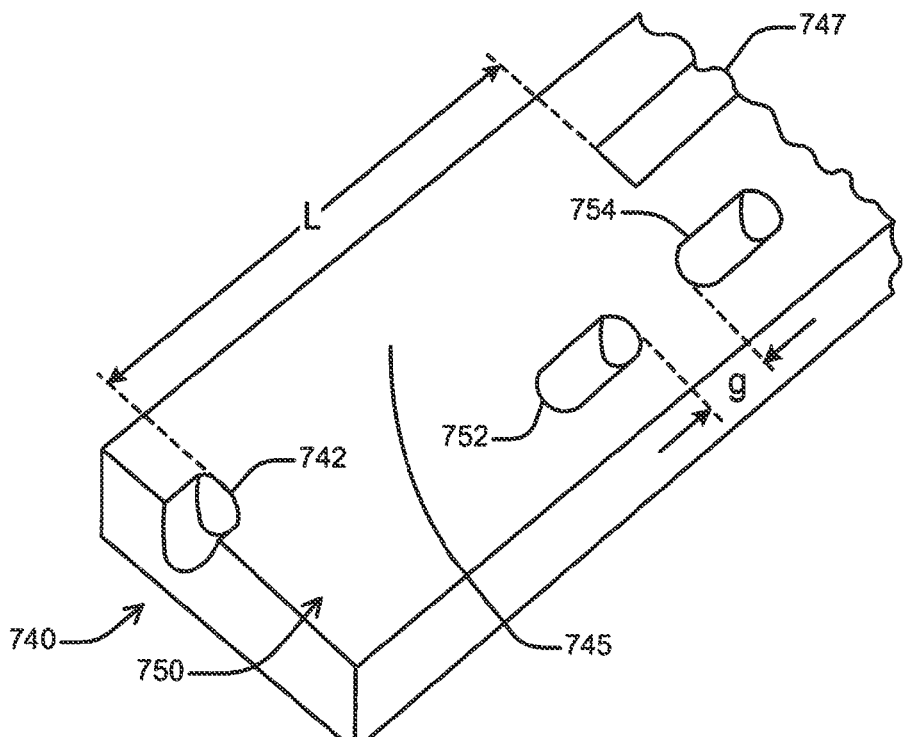
FIG. 7b is a perspective sectional view of a blank section in a recordable area.

FIG. 7b is a schematic illustration of a perspective view of a blank section 745 in a recordable area. In this example, blank section 745 is associated with track 740, and lies between pre-recorded pits 742 and 747. FIG. 7b also shows a track 750 adjacent to track 740, with pre-recorded pits 752 and 754. The blank recordable section 745 has a length (L) that is a few orders of magnitude larger than the gap (g) between pre-recorded pits 752 and 754, e.g., length (L) is on the order of 100 μm compared to gap (g) of about 0.4 to 2.0 μm. The length L should be sufficiently long for recording appropriate data in the corresponding blank section. In one embodiment, the length is sufficient for recording a minimal data pattern, e.g., a bit of data. In another embodiment, L is greater than about 10 μm. One embodiment also provides for L being less than about 100 μm, and another embodiment provides for L being greater than about 10 μm and less than about 100 μm. Unlike recordable section 745, the gap between 752 and 754 is a part of the pre-recorded data stream, and is not recordable. In another embodiment, it may also be possible that the blank section 745 lies between two recording grooves on spiral track 740 (instead of pre-recorded pits 742 and 747).

A unique signature may be generated by filling only certain blank or gap sections (e.g., sections 710 and 730 of FIG. 7a) with appropriate data, while leaving one or more other blank sections (e.g., section 720) empty or filling them with uncorrectable data that would render these gaps unreadable. The resulting pattern of readable and unreadable sectors or sections (e.g., by introducing incorrect data) will represent a disc's unique data content or serial number information, which may be used for identification purpose. In this context, appropriate data refers to data that matches error correction data or code that has been pre-recorded in the relevant data sector (e.g., data that results in readable data and/or sector). The proposed gaps or blank sections (without appropriate data being recorded), will introduce too many errors to be correctable by the error correction data. In addition, if the gaps are written with data not matching the error correction data (e.g., inappropriate data), the sector data will also be uncorrectable, thus rendering the sector unreadable.

In another embodiment, instead of writing data to one or more recordable areas, the finalizing encoder can also write additional data to one or more recordable areas having a recording medium over the pre-recorded areas, e.g., by overwriting certain sections of pre-recorded data, making those sectors unreadable. Again, the resulting pattern of unreadable sectors can then represent unique data content for identification purpose.

In another embodiment, a description of the data (e.g., metadata required for the finalization process) that is written to the control data area (part of the lead-in area) or other information area in the finalization process may be stored in one or more pre-recorded sections of the disc, preferably in an encrypted format. The description may include the content of the data, as well as the location for recording the data. Examples of pre-recorded sections suitable for storing such a description include a portion of the lead-in area not containing other control data, such as the "initial zone" for DVD, an unused section of the program area (i.e., without pre-recorded data), or in the lead-out area. By storing this information on the disc, there is no need for connecting to a database to determine what needs to be recorded at which location during the finalization process.

In yet another embodiment, instead of leaving the control data section of the lead-in open, at least a portion of the file system (different from control data), e.g., in the lead-in area, may be left blank. With an incomplete file system, the program content on the disc will not be readable. Thus, if proper or appropriate data is written to complete the file system in a recordable region, the disc's content can be made readable.

Since a conventional DVD recording device cannot be used for recording data in the recordable areas of a disc manufactured according to one or more of the present principles, a recording device is also provided for this purpose. In one example, the recording device is a custom laser having a wavelength in the blue-ultraviolet region of the spectrum, which is designed for use with a 0.6 mm substrate such as that for a DVD. If desired, the recording device may also be adapted for use with other substrate thickness for different optical disc formats. In one embodiment, the blue-ultraviolet laser is similar to that used in a high definition (HD) DVD recorder, e.g., at a wavelength of 405 nm, which can track on the recording grooves of the present principles and record the lead-in/control data and custom data necessary to finalize or close the recording of the disc. The recording device, which has special or custom software or firmware, optical and electronic components designed for recording in the recordable areas of the hybrid disc, may be modified from a conventional HD DVD recorder pickup. Furthermore, it may be possible to modify existing Blu-ray drives for this purpose by changing to appropriate optics, including, for example, an objective lens with a proper numerical aperture (e.g., 0.6) and with spherical aberration compensation for 0.6 mm substrate thickness.

For example, the software or firmware (e.g., processor with program stored thereon) on the recording device may provide instructions for performing a method, which includes retrieving information for identifying at least one recordable region on a disc, e.g., by at least accessing pre-recorded data on the disc or accessing a database external to the disc, and directing a laser to write additional data to the recordable region. The method may also include an instruction for the laser to track on a recording groove for writing the data. As previously discussed, the recordable region(s) may be identified by one or more sector numbers, signal characteristics and/or zone identifiers. Depending on the specific configuration in the recordable region, different data may be recorded for various purposes, e.g., to provide custom or unique data for serialization or identification purpose, controlled activation of a disc (to make the disc or program content readable), or to provide updates or additions to the program content.

Although the above examples have focused on applications to DVDs, embodiments of the present principles may be applied to CDs, BDs or high definition/density (HD) DVDs, with suitable adaptations to the respective recording formats and manufacturing materials to ensure that the final disc meets the pre-recorded disc specifications, e.g., in accordance with applicable standards.

One application in which optical discs of the present invention are particularly valuable is the distribution of high value software that may need to be uniquely serialized with purchase data (e.g. timestamp or customer information). Using conventional techniques with standard recordable media, a full recording session for the entire disc, i.e., including the program data and the purchase data, is required.

Embodiments of the present principles, however, enable hybrid discs ("recordable pre-recorded") to be quickly edited with relatively small amount of custom data and lead-in information, which can be used for serialization, security, product code, encryption key embedding, disc activation or other applications, thus allowing publishers to uniquely identify each pre-recorded disc at a machine-readable level. After recording the additional data, the finalized disc can be recognized as a pre-recorded disc by standard recorder and reader devices, thus enhancing playback compatibility, e.g., especially on DVD-Video discs that are protected with (CSS) copy protection. Other applications include addition of unique serialization data used for the control of Managed Copy applications (which allow consumers to make legal copies of copy-protected digital content by obtaining authorization through a remote server) and for the addition of retailer specific branding or merchandizing campaigns.

Thus, the hybrid discs of the present invention have various advantages over other conventional DVDs. For example, the additional or customization data of this invention is likely to require a very small recorded area, thus allowing for faster recording and reduced cost compared to a full recording of DVD-R media. Although one supplier offers proprietary technology for manufacturing a disc with a pre-recorded zone containing a software program, and a recordable zone for adding a customer's photographs (e.g., KODAK Picture CD), that technology does not afford the ability to make the disc appear as if it were pre-recorded, and thus, will not provide an advantage of improved player compatibility, as can be realized by a disc of the present principles. Furthermore, discs of the present invention offer a higher level of security to publishers because the disc media is unique on a title basis, and access to the pre-recorded, yet non-finalized or un-activated media can be more tightly controlled.

Compared to DVD BCA Code, embodiments of the present principles allow a larger portion of the DVD to be available as recordable area for custom data, whereas the DVD specifications allow a maximum of only 188-bytes data to be stored in BCA code, which is insufficient for high security encryption keys. Furthermore, implementations of the present principles allow as much as 5 MB of custom data to be recorded in less than 20 seconds, whereas other custom serialization technologies (e.g., Sony's post-scribed ID, or PID) have limitations on custom data storage capacity, typically substantially less than 1 kB.

It is understood that the examples discussed herein are meant to be illustrative, and one or more features of the present invention may be implemented separately, or in various combinations with each other. Thus, various embodiments of groove structure or configuration discussed above may be implemented alone, or in conjunction with each other, for recording one or more types of additional data. For example, a pre-recorded disc may have grooves in recordable regions with different depths, e.g., shallow grooves and deep grooves, or it may also include both continuous and discontinuous grooves in different regions. Furthermore, these features may also be implemented in different configurations or formats of optical discs, including providing the recordable area and pre-recorded area on the same layer or different layers of a double-layer disc.

While the forgoing is directed to various embodiments of the present invention, other and further embodiments of the invention may be devised without departing from the basic scope thereof. As such, the appropriate scope of the invention is to be determined according to the claims, which follow.

The invention claimed is:

1. A recording device, comprising:
a processor configured to:
retrieve information for identifying at least one recordable region of a disc by one of: accessing pre-recorded data on the disc, and accessing a database external to the disc; and
direct a laser to write additional data to the at least one recordable region during a finalization procedure after disc manufacturing; wherein the additional data includes at least one of: custom data for augmenting program content on the disc, custom data unique to the disc, control data, and file system data;
wherein the at least one recordable region has at least one groove with a plurality of gaps; and the laser is configured for writing data to at least one of: the groove, and one of the plurality of gaps; and
wherein the laser is configured to write data to at least one gap and each of the plurality of gaps has a length less than about 200 nm.

2. The recording device of claim 1, wherein the laser has a wavelength in a blue-violet region.

3. The recording device of claim 1, wherein the plurality of gaps have a separation between adjacent gaps of less than about 10 μm.

4. The recording device of claim 1, wherein the plurality of gaps have a separation between adjacent gaps of between about 0.5 μm and 2 μm.

5. The recording device of claim 1, wherein each of the plurality of gaps has a length of at least about 75 nm.

6. The recording device of claim 1, wherein the at least one groove having a depth ranging from about 10 nm to about 300 nm.

7. The recording device of claim 1, wherein the at least one groove having a width between about 50 nm to about 250 nm.

8. The recording device of claim 1, wherein the at least one recordable region is located on a data layer containing pre-recorded data.

9. The recording device of claim 1, wherein the at least one groove having a depth of less than about 100 nm.

10. The recording device of claim 1, wherein the at least one groove having at least one discontinuity.

11. The recording device of claim 1, wherein the laser is configured for writing data to at least one grooveless region in the at least one recordable region, the grooveless region having a length less than about 100 μm along a data track.

12. The recording device of claim 1, wherein the laser is configured for writing data to at least one grooveless region in the at least recordable region, the grooveless region having a length greater than about 10 μm.

13. The recording device of claim 1, wherein the laser is configured for writing data to the at least one recordable region such that program content recorded during manufacturing of the disc becomes readable.

14. The recording device of claim 1, wherein the laser is configured for writing additional data including at least one of: serialization data, and data that matches at least one error correction code in the at least one recordable region.

15. The recording device of claim 1, wherein the laser is configured for tracking on at least one groove in the at least one recordable region for writing the additional data.

16. The recording device of claim 1, wherein the laser is configured for writing the additional data to the at least one recordable region located outside a lead-in area and a lead-out area of the disc.

17. A recording device, comprising:
a processor configured to:
retrieve information for identifying at least one recordable region of a disc by one of: accessing pre-recorded data on the disc, and accessing a database external to the disc; and
direct a laser to write additional data to the at least one recordable region during a finalization procedure after disc manufacturing; wherein the additional data includes at least one of: custom data for augmenting program content on the disc, custom data unique to the disc, control data, and file system data;
wherein the at least one recordable region has at least one groove with a plurality of gaps; and the laser is configured for writing data to at least one of: the groove, and one of the plurality of gaps; and
wherein the laser is configured for writing data to at least one gap having a length less than about 200 nm.

18. The recording device of claim 17, wherein the laser has a wavelength in a blue-violet region.

19. The recording device of claim 17, wherein the plurality of gaps have a separation between adjacent gaps of less than about 10 μm.

20. The recording device of claim 17, wherein the plurality of gaps have a separation between adjacent gaps of between about 0.5 μm and 2 μm.

* * * * *